United States Patent Office 3,454,706
Patented July 8, 1969

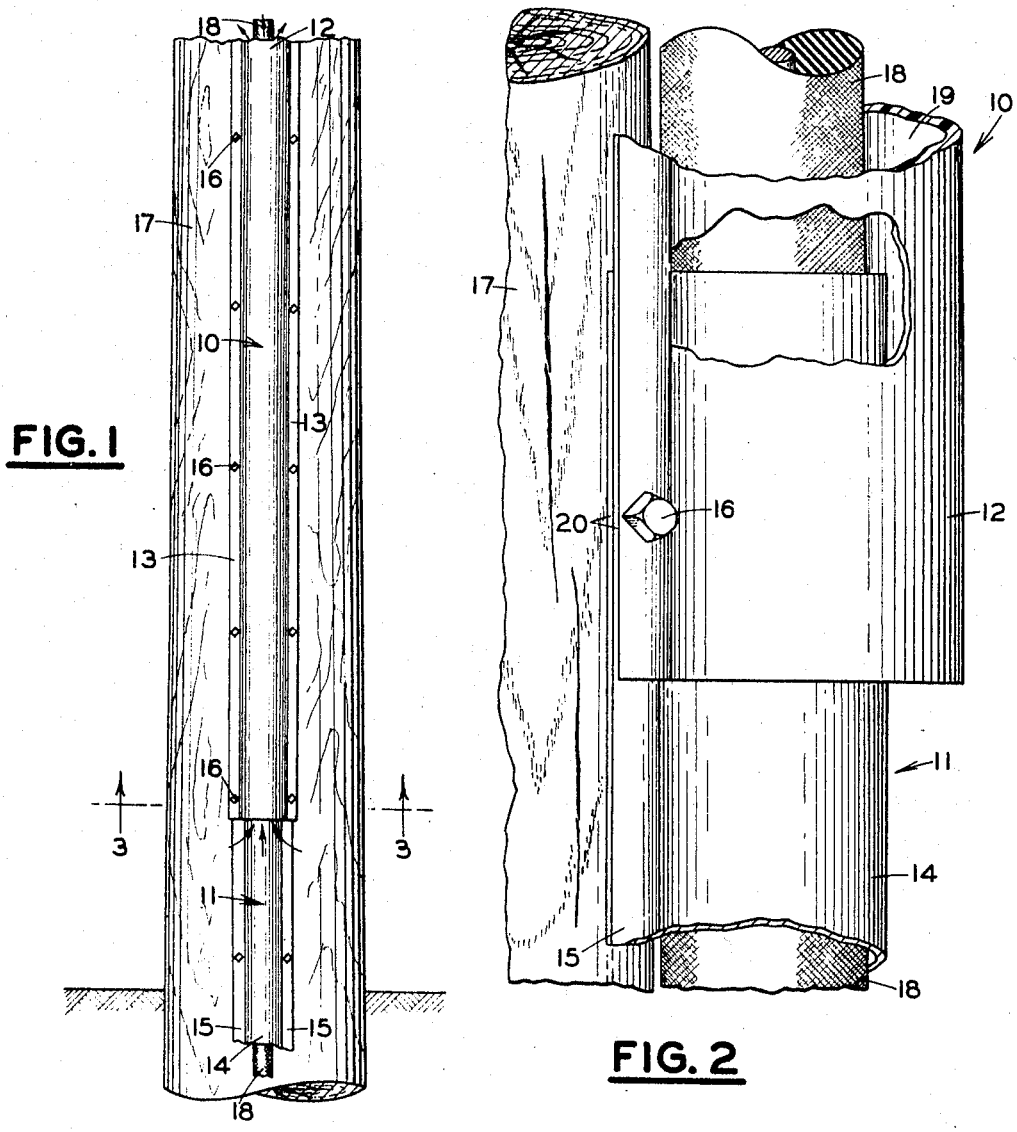
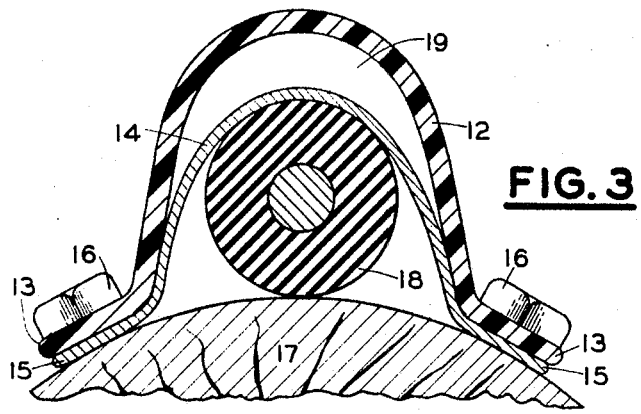

3,454,706
ELECTRIC POLE LINE STRUCTURE WITH RISER CABLE IN A VENTILATED DUCT
J. Hebden Willox, 917 Newcastle Ave., Westchester, Ill. 60153
Filed Oct. 21, 1968, Ser. No. 769,278
Int. Cl. H02g 7/20; H01b 9/06, 7/34
U.S. Cl. 174—45                                      7 Claims

ABSTRACT OF THE DISCLOSURE

An electric pole line structure has a cable-containing trough-shaped guard duct run extending along the pole, the duct run being divided into a long upper segment which is joined near the ground line to a short lower segment, the latter extending below the ground surface. The segments differ in size, the lower end of the long upper segment overlapping the upper end of the short lower segment to provide an air inlet opening therebetween for convective air cooling of the contained cable. The trough-shaped opening of the short lower segment limits the cross sectional area of the cable fitted therein to a size which can be effectively cooled in the long upper segment.

Background of the invention

This invention relates generally to electric pole line structures, and specifically to a ventilated guard duct enclosing a riser cable extending along an upright pole from an elevation below ground level to an elevation above ground level.

It is common practice to connect underground and overhead distribution conductors by means of pole riser cables, and such risers are commonly covered with some sort of conduit, guard or shield as protection against mechanical damage. To avoid electrical shock hazard to linemen on the pole, the upper segment of the guard duct run, which may be near live conductors, is preferably formed from an insulating material, while the portion entering the ground is preferably formed from a conducting metal to prevent this segment from rising above ground potential in the event of insulation failure.

The rugged insulating material required to resist impact is a relatively poor heat conductor, and to avoid derating the enclosed cable it is desirable to provide convective air movement upwardly along the cable from a cool-air elevation near groundline through the duct run. To assure adequate chimney space alongside the cable, it is necessary to coordinate its cross sectional area with that of the cable passageway.

Summary

The pole line structure of the present invention includes a very simple and inexpensive pole riser duct construction effective for protecting the enclosed cable from both mechanical and thermal damage. The duct construction includes a relatively long trough-shaped upper segment extending over the vertical cable along the pole, this segment being preferably formed of an insulating plastic, the trough opening along the long upper segment being measurably larger than the contained cable. The lower end of the upper segment is terminated above and near ground elevation.

A relatively short trough-shaped lower segment, having an overall depth less than the depth of the trough opening along the upper segment, is joined to and overlapped in spaced relationship by the lower end of the upper segment, and extends downwardly therefrom to an elevation below ground to meet the underground cable to be run up the pole.

Among the objects of the present invention are: (a) the provision of a pole guard duct run for an electric pole riser cable effective for preventing impact damage or other mechanical injury; (b) the provision in such a structure of a simple and effective cable ventilation and cooling system; and (c) to provide in a two-segment pole riser duct run a construction assuring a desirable relationship between the size of the passageway in the respective segments and the size of the cable therein.

Other objects and advantages will be apparent from the specification and claims herewith, and from the accompanying drawing.

Brief description of the drawing

FIG. 1 is a fragmentary elevation showing the ventilated guard duct run attached to a pole, with the arrows at the respective ends of the upper segment indicating the movement of ambient air entering at the lower end of the upper segment for movement along the cable and then leaving the duct at the upper end;

FIG. 2 is a fragmentary side elevational view drawn to a larger scale, with the upper overhanging segment partially broken away to show the overlapping vent construction; and FIG. 3 is a section along the line 3—3 of FIG. 1, further illustrating the disposition of the elements at the overlapping juncture of the long upper segment with the short lower segment.

Description of the preferred embodiment

As shown in FIG. 1, the pole riser duct run has a long upper segment 10 which extends upwardly along the surface of the pole 17 from an elevation above and near ground elevation, at which it joins the relatively short lower segment 11, the latter extending to an elevation below ground to receive the underground insulated cable 18.

Both upper and lower segments are generally trough-shaped in contour, and are formed with marginal flanges for engaging the surface of the pole, the long upper segment 10 including the longitudinally extended trough-shaped portion 12 and the marginal flanges 13, and the short lower segment including a similar but somewhat smaller trough-shaped portion 14 and the marginal flanges 15. Both segments are adapted for attachment to the pole along the marginal flanges by the lag screws 16.

As shown in FIGS. 2 and 3, an air inlet opening 19 results from the spaced overlapping of the lower end portion of the upper segment 10 with respect to the upper end portion of the lower segment 11. The marginal flanges 13 and 15 engage in coextensive abutment as indicated at numeral 20 of FIG. 2, the rigid connection between the upper and lower segments being effected by the fastener 16 in its extension through the overlapping flanges into the pole.

To avoid the hazard to linemen of a grounded conductor in the climbing or working space near conductors energized at a high voltage, the long upper segment of the guard duct run is preferably formed from a suitable insulating plastic. To satisfactorily protect the enclosed cable from impact, as from a moving vehicle, it is essential that this segment be constructed of a rugged material of ample thickness, and this type of duct run is in common use as a mechanical protection. Such a duct run obviously is an efficient heat barrier; in other words, mechanical protection creates a thermal problem in this segment of the duct run.

On the contrary, the short lower segment, being in effect a coupler or continuation of the associated underground structures, is preferable formed from a conducting material, so that the short portion extending above the ground and accessible to the public is maintained at ground potential in the event of an insulation failure. A relatively thin wall along the lower segment is both desired and appropriate, due to the inherent thermal conductivity and mechanical strength of suitable metals, such as steel.

The trough-shaped opening along the short lower segment determines the desired sized of the opening along the long upper segment, for the reason that it is essential that the air inlet be large enough to pass the quantity of ambient air needed to cool the contained cable, and the size of the air inlet is directly related to the size of the long upper segment. This set of conditions enables the use of the short lower segment as a gauge for limiting the maximum size of cable to that which will be acceptably cooled in the long upper segment, because the larger the opening in the short lower segment, the smaller the unoccupied flue or chimney space in the long upper segment.

As an example, a cross-linked polyethylene insulated riser cable on a 7 inch diameter pole and having a cross sectional area of 1.75 square inches may emerge from the ground through a short lower ground coupler segment of galvanized steel having a cross sectional area of opening of 3.6 square inches and extending upwardly under an insulated upper segment having an opening of 4.6 square inches, yielding an air inlet opening of between 25% and 30% of the cable cross sectional area. Arrangements having these general relationships provide for movement of convective cooling air through the upper segment along the entire periphery of the cable, except perhaps for line contacts. It will of course be apparent that any pole riser cable smaller in size will operate satisfactorily, and further, that a cable too large for proper cooling cannot be installed, the limiting size being predetermined by the cross sectional area of the short lower segment through which it must pass.

What I claim as my invention, and desire to secure by Letters Patent of the United States is:

1. In an electric pole line structure including a ground-supported upstanding pole, an insulated cable susceptible to thermal damage by energy losses attending the passage of current therethrough, said cable extending upwardly along the outer surface of the pole from an elevation below the ground elevation, a generally trough-shaped cable-receiving guard duct run coextensive with said cable, said guard duct run including a trough portion having a trough-shaped opening therealong within which said cable is disposed and marginal flanges with associated fastening means for attaching the guard duct to the pole, the improvement wherein the guard duct run comprises a long upper segment extending upwardly along the pole from an elevation above and in close spatial relationship with the ground elevation and a relatively short lower ground coupler segment serially connected thereto and extending downwardly to an elevation below ground elevation, the depth of the trough-shaped opening along the long upper segment exceeding the overall depth of the lower segment, the lower segment extending upwardly along the upper segment of the duct run beyond the lower end thereof, the trough portion of the upper segment depending over the trough portion of the lower segment in spaced relationship therewith, and the respective marginal flanges engaging in coextensive abutment.

2. The pole line structure according to claim 1, in which fastening means common to the respective marginal flanges of both segments of the duct run rigidly joins both segments in endwise relationship wherein the lower end portion of the long upper segment overlaps the upper end portion of the lower ground segment and thereby secures the marginal flanges along the overlap in abutting relationship.

3. The pole line structure defined in claim 1, wherein the cross sectional area of the trough-shaped opening along the upper segment of the guard duct run is larger than the cross sectional area of the largest cable which can be fitted into the trough-shaped opening of the lower segment.

4. The pole line structure according to claim 1, wherein the material of the lower ground coupler segment is metallic and the material of the upper segment is a nonmetallic plastic.

5. The pole line structure in accordance with claim 1, wherein the trough-shaped opening along each segment of the duct run is uniform in size and shape between the respective ends of each segment.

6. The pole line structure as claimed in claim 1, in which the wall thickness of the lower coupler segment is less than the wall thickness of the upper segment.

7. The pole line structure as recited in claim 1, wherein the cross sectional area of the vent opening at the overlap, bounded by the outside of the wall of the short lower segment and the inside of the wall of the long upper segment into which the lower segment extends, is at least 25% of the cross sectional area of the cable.

References Cited

UNITED STATES PATENTS

| 2,230,734 | 2/1941 | Van Antwerp | 174—45 |
| 2,541,406 | 2/1951 | Clapp | 174—45 |
| 2,859,270 | 11/1958 | Patchin | 174—16 |
| 2,945,081 | 7/1960 | Bogese et al. | 174—45 |
| 3,075,037 | 1/1963 | Schlein | 174—5 |
| 3,162,720 | 12/1964 | Phillips | 174—45 |

LARAMIE E. ASKIN, *Primary Examiner.*

U.S. Cl. X.R.

174—16